US00RE40544E

(19) United States
(12) Reissued Patent
Suh

(10) Patent Number: US RE40,544 E
(45) Date of Reissued Patent: Oct. 21, 2008

(54) ROOF STRUCTURE FOR FOLDING TENT FRAME

(75) Inventor: Dong Woog Suh, Taegu (KR)

(73) Assignee: Caravan Canopy International, Inc., La Mirada, CA (US)

(21) Appl. No.: 11/716,065

(22) Filed: Mar. 7, 2007

Related U.S. Patent Documents

Reissue of:
(64) Patent No.: 6,868,858
Issued: Mar. 22, 2005
Appl. No.: 10/400,386
Filed: Mar. 28, 2003

(30) Foreign Application Priority Data

Mar. 28, 2002 (KR) ..... 10-2002-17114

(51) Int. Cl.
*E04H 15/50* (2006.01)

(52) U.S. Cl. ..... 135/145; 135/131
(58) Field of Classification Search ..... 135/145, 135/131, 122, 124, 125, 126, 132, 133, 135, 135/139, 147, 159
See application file for complete search history.

(56) References Cited

U.S. PATENT DOCUMENTS

| | | | |
|---|---|---|---|
| 402,755 | A | 5/1889 | Lyon |
| 1,666,757 | A | 4/1928 | Snyder |
| 4,280,521 | A | 7/1981 | Zeigler |
| 4,558,713 | A | 12/1985 | Hagler et al. |
| 4,627,210 | A | 12/1986 | Beaulieu |
| 4,637,748 | A | 1/1987 | Beavers |
| 4,779,635 | A | 10/1988 | Lynch |
| 4,947,884 | A | 8/1990 | Lynch |
| 5,069,572 | A | 12/1991 | Niksic |
| 5,333,634 | A | 8/1994 | Taylor |
| 5,485,863 | A | 1/1996 | Carter |
| 5,511,572 | A | 4/1996 | Carter |
| 5,632,293 | A | 5/1997 | Carter |
| 5,634,483 | A | 6/1997 | Gwin |
| 5,638,853 | A | 6/1997 | Tsai |
| 5,701,923 | A | 12/1997 | Losi, Jr. et al. |
| 5,797,412 | A | 8/1998 | Carter |
| 5,797,695 | A | 8/1998 | Prusmack |
| 5,813,425 | A | 9/1998 | Carter |
| 5,871,026 | A | 2/1999 | Lin |
| 5,921,260 | A | 7/1999 | Carter |
| 5,944,040 | A | 8/1999 | Jang |
| 6,076,312 | A | 6/2000 | Carter |
| 6,138,702 | A | 10/2000 | Carter |
| 6,240,940 | B1 | 6/2001 | Carter |
| 6,283,136 | B1 | 9/2001 | Chen |
| 6,345,639 | B2 | 2/2002 | Rousselle et al. |

(Continued)

FOREIGN PATENT DOCUMENTS

| | | |
|---|---|---|
| JP | 11062323 A | 3/1999 |
| WO | WO97/33059 | 9/1997 |
| WO | WO02/64918 A1 | 8/2002 |

*Primary Examiner*—Janet M Wilkens
(74) *Attorney, Agent, or Firm*—Christie, Parker & Hale, LLP

(57) ABSTRACT

A tent frame including: leg posts; a plurality of expandable connectors connected in pairs between adjacent posts, each connector having first and second outer ends and is fixedly connected at the first outer end to the upper end of one post and slidably connected at the second outer end to a lower portion of the same post, each connector movable between extended and folded states; a roof comprising upper poles, each pivotally connected to a post and to a central pole, each upper pole and corresponding central pole are movable between an extended and folded states; and support pole assemblies, each connected at one end to slide with a second outer end and at another end to a central pole so that each connector, upper pole and central pole expand together to the extended state and the support pole assemblies support the central poles to maintain the extended state.

18 Claims, 10 Drawing Sheets

U.S. PATENT DOCUMENTS 6,397,872 B1 6/2002 Carter
6,431,193 B2 8/2002 Carter
6,470,902 B1 10/2002 Carter
6,601,559 B1 8/2003 Carter
6,601,599 B2 * 8/2003 Carter ..... 135/145
6,666,223 B2 12/2003 Price et al.
6,708,707 B2 3/2004 Dotterweich et al.
6,725,873 B2 4/2004 Liu
6,779,538 B2 8/2004 Morgante et al.
6,899,112 B2 5/2005 Tsai
2002/0074031 A1 * 6/2002 Morgante et al. ..... 135/128
2003/0164185 A1 9/2003 Price
2004/0020526 A1 2/2004 Deng

* cited by examiner

ROOF STRUCTURE FOR FOLDING TENT FRAME

Matter enclosed in heavy brackets [ ] appears in the original patent but forms no part of this reissue specification; matter printed in italics indicates the additions made by reissue.

FIELD OF THE INVENTION

The present invention pertains generally to a roof structure for a foldable tent frame, such as might be used, for example, at conventions, parties, weddings, fairs, carnivals, outdoor sporting events and the like. More particularly, the present invention provides a roof structure for a foldable tent frame that has a simple structure, is lightweight, and provides a pleasing new geometrical form. Specifically, the roof structure for a foldable tent frame in accordance with the present invention has a gently curved roof with an upwardly protruding center that moves into the expanded or deployed position as the four leg poles of the tent frame assembly unfold into the expanded or deployed position. The roof structure in accordance with the present invention achieves its unique curved geometry without the need of an upright central post to support the center of the tent as is commonly seen in the roof structures of conventional foldable tents.

BACKGROUND OF THE INVENTION

Typical conventional foldable tent frames, such as disclosed in U.S. Pat. Nos. 6,397,872, 6,431,193, and 6,470,902, issued to Carter and U.S. Pat. No. 5,638,853, issued to Tsai, use one or more X-shaped connectors to form scissors assemblies to connect between four leg posts. The scissor assemblies can expand and contract between the leg posts thereby expanding the distance between the posts out to a maximally expanded deployed position. Typically, each scissors assembly is attached to fixed brackets or angles disposed on the top ends of the corresponding leg posts and is attached to movable, sliding brackets or angles disposed to slide along the corresponding leg posts. In this manner, each scissor assembly may expand or contract by pulling the leg posts away from, or towards, each other respectively because each scissor assembly is fixed to the top of its corresponding leg posts and is secured to move with the sliding brackets also on the corresponding leg posts. The roof structure disclosed in U.S. Pat. No. 6,397,872 is attached to the scissor assemblies and is configured to expand as the scissor assemblies expand between the leg posts. Central scissor assemblies are connected to the center of the peripheral scissor assemblies (i.e., the scissor assemblies connecting adjacent leg posts) so that the central scissor assemblies unfold as the peripheral scissor assemblies are moved into the expanded state. The central scissor assemblies are made using X-shaped connectors in a manner similar to how the peripheral scissor assemblies are constructed. At the same time as the peripheral and central scissor assemblies are expanded, a central support member is raised into its vertical supporting position and has an extendable vertical peak pole member that is used to support a tent canopy and provide a peak for the tent canopy.

With the conventional foldable tent frame, once the tent is completely unfolded into its fully expanded or deployed position, the roof forms an angular pyramid or triangular shape (i.e., a "A" shape). One drawback of such conventional foldable tent roof structures is that the configuration requires a center post, or central support member, and several central scissor assemblies connected together to lift the center post, or central support member, upwards into its vertically extended or deployed position. These added structures add to the overall weight of the tent frame, and the cost to manufacture such a tent frame is inevitably increased. Moreover, because the roof invariably forms an angular pyramid or triangular shape (i.e., a "A" shape), extra installation speed (i.e., height) is required. Lastly, the protruding top or center post is likely to be affected by strong winds.

To overcome this structural drawback, several roof structure configurations have been constructed such as disclosed in U.S. Pat. Nos. 6,431,193, 6,470,902 and 5,638,853 that avoid the use of central scissor assemblies and the central support member. However, the trade off is that these roof structures are relatively flexible and flimsy, which means that these structures tend to collapse in strong winds or have profiles that are lowered. For example, the collapsible shelter with flexible collapsible canopy disclosed in U.S. Pat. No. 6,431,193 ("Carter '193 Patent") has a flexible roof structure provided by four segmented flexible poles connected together at one end by a central hub member and connected at the opposite end to the scissors assembly ("perimeter truss pairs") of the perimeter framework. With the roof structure erected into its extended position, the roof structure can flex between an upper convex position and a lower concave position while the perimeter truss pairs are in an extended position. This Carter '193 Patent also teaches that because the roof structure is flexible, it collapses during strong winds or that its profile is lowered. However, there is a demand for lightweight tent structures that have reinforced, lightweight roof structures that avoids this flexible, collapsible feature because many consumers do not want a tent with a roof that will collapse or lower its profile in strong winds.

The Carter '193 Patent is the most recent member of a patent firmly that includes the following patents: U.S. Pat. No. 5,511,572, ("Carter '572 Patent"), U.S. Pat. No. 5,632,293 ("Carter '293 Patent"), U.S. Pat. No. 5,797,412 ("Carter '412 Patent"), U.S. Pat. No. 5,921,260 ("Carter '260 Patent"), U.S. Pat. No. 6,076,312 ("Carter '312 Patent"), and U.S. Pat. No. 6,240,940 ("Carter '940 Patent"). Various disadvantageous features of these patents are not present in the present invention.

The Carter '572 Patent claims a plurality of clip members for removably receiving pole members. The present invention does not have this feature. The drawback of the canopy disclosed by Carter '572 Patent is that flexible, collapsible pole members must be inserted into the clip members when collapsed, which adds to the complexity of storing and deploying the canopy.

The Carter '293 Patent claims a flexible, collapsible canopy movable between a normal raised position and a lowered position when the perimeter truss pairs are in the extended position. FIGS. 8 and 17 of the Carter '293 Patent illustrate this feature. The roof structure for a folding tent frame in accordance with the present invention does not have the ability to flex and collapse while the truss structure is in the extended position. As mentioned above for the Carter '193 Patent, the drawback of the canopy of the Carter '293 patent is that the canopy may flex into the lowered position during strong winds, thereby striking or otherwise interfering with people taking shelter underneath the canopy.

The Carter '312 Patent claims a flexible, collapsible canopy wherein the flexible, collapsible canopy is movable from a normal raised position to a lower position when the perimeter truss pairs of link members are in the second position, thereby providing the collapsible shelter with a reduced profile when a portion of elongated members is in the lower position. FIGS. 8 and 17 of the Carter '312 Patent illustrate this flexible, collapsible feature of the Carter canopy; however, the roof structure of the folding tent frame in accordance with the present invention does not have this feature because the roof cannot flex and collapse when the supporting truss assembly is in the extended position. As mentioned above for the Carter '912 Patent, the drawback of the canopy of the Carter '312 patent is that the canopy may flex into the lowered position during strong winds, thereby striking or otherwise interfering with people taking shelter underneath the canopy.

The Carter '940 Patent claims a flexible canopy being flexible and movable from a normal raised position to lower positions when the perimeter truss pairs are in the second extended position, thereby providing the collapsible shelter with a reduced profile when at least a position of elongated members of the canopy are in lower positions. FIG. 17 of the Carter '940 patent shows this claimed feature as a partially collapsed canopy when wind blows thereon even though the perimeter truss pairs are in the extended position. As discussed above, the roof structure in accordance with the folding tent structure of the present invention does not have this feature. As mentioned above for the Carter '193 Patent, the drawback of the canopy of the Carter '940 patent is that the canopy may flex into the lowered position during strong winds, thereby striking or otherwise interfering with people taking shelter underneath the canopy.

To avoid the drawbacks of tent structures having flexible, collapsible roof structures similar to those disclosed and claimed in the Carter '293 Patent, for example, others have developed relatively inflexible reinforced roof structures such as disclosed in U.S. Pat. No. 6,470,902 ("Carter '902 Patent") to Carter and U.S. Pat. No. 5,638,853 ("Tsai Patent") to Tsai. Generally, these tent structures have roof structures provided by four pole members connected to a central hub at one end and to the perimeter scissors assembly at the other end. The four pole members are segmented, each pole member having a joint or hinge between two pole segments so as to fold or pivot about the joint or hinge whenever the roof structure moves between collapsed and extended positions. To prevent the four pole members from having the type of flexibility in the extended position as described in the Carter '293 Patent a support strut member is provided for each of the four pole members. Each support strut member is connected at one end to the lower one of the pole segments of the corresponding pole member and at the other end to the movable, sliding bracket or angle disposed to slide along the corresponding leg of the perimeter scissors assembly. The support strut members reinforce the roof structure so as to prevent the pole members from flexing or collapsing while the roof structure and the perimeter scissors assembly are in the extended position. Thus, roof structures such as disclosed in the Carter '902 Patent and the Tsai Patent do not have the feature of the Carter '293 Patent, wherein the roof structure flexes between an upper convex position and a lower concave position while the perimeter truss pairs are in an extended position.

Despite this added strength, roof structures of the kind disclosed in the Carter '902 Patent and the Tsai Patent have several drawbacks. First, the shape of the roof structure approximates an angular pyramid or triangular shape, which has a limiting effect on the amount of headroom provided under the canopy placed on the roof structure. A roof structure that more closely approximates a circular dome shape would provide more head room for a given height of the peripheral scissors assembly. Furthermore, a roof structure that more closely approximates a dome shape would provide an aesthetically pleasing look that has not yet been achieved in the art of portable folding tent or canopy structures utilizing scissor truss assemblies. In addition, the tent frame made in accordance with the present invention does not have the strut members mounted on a shaft between adjacent pair of link members as disclosed in the Carter '902 Patent. This structure of the Carter '902 Patent has the drawback of unnecessarily complicating the manufacture of the canopy without a substantial benefit.

The roof structure disclosed by the Tsai Patent is less complicated than the Carter '902 Patent. However, the tent structure disclosed by the Tsai Patent includes a cumbersome and specialized hinge ("intermediate pivot connecting member") between the first and second rod members that form the roof structure. Specifically, this specialized hinge includes a pair of opposing pivot members spaced above a board member. The present invention does not use this kind of a specialized hinge. The tent structure in accordance with the present invention utilizes a protruding hinge instead of that an upper pole is connected to a central pole, and a support pole assembly is then connected to both the upper pole and the central pole using other protruding hinges. In this manner, the tent structure in accordance with the present invention provides a gentle roof curve when deployed as will be described in detail below.

Therefore, it is an object of the present invention to provide a new foldable lightweight tent frame having a simple structure that can form a gentle roof curve with the center protruding upward by unfolding the peripheral scissors assembly and deploying the leg posts.

It is another object of the present invention to provide a configuration of a foldable tent structure wherein the roof is deployed as it extends upward as the leg posts are deployed and the peripheral scissor assembly unfolds, thereby offering a new type of frame that allows a plurality of poles, which are relatively thin and elastic enough to bow or bend a little, to form a roof as the leg posts are deployed and the peripheral scissor assembly unfolds.

It is another object of the present invention to provide a foldable tent structure having a roof structure that more closely approximates a convex circular dome shape to provide more head room for a given height of the peripheral scissors assembly.

It is another object of the present invention to provide a foldable tent structure having a roof structure that more closely approximates a circular dome shape to provide a new pleasing aesthetic look previously not achieved in portable, foldable tent structures.

It is another object of the present invention to provide a foldable tent structure that is easy and cost effective to manufacture.

It is another object of the present invention to provide a foldable tent structure that is durable and easy to clean and maintain.

SUMMARY OF THE INVENTION

In accordance with the above objectives, the first embodiment of the present invention provides a foldable tent frame characterized by: (a) at least three leg posts, each post being located at a corner of the tent frame;(b) a plurality of expandable connectors connected in pairs, wherein each pair of expandable connectors connects between two adjacent posts, wherein each connector has a first outer end and a second outer end, wherein each connector is fixedly connected at the first outer end to the upper end of one of the posts and is slidably connected at the second outer end to a lower portion of the same one of the posts, wherein each connector is movable between an extended state and a folder state; (c) a roof comprising at least three upper poles, each upper pole being pivotally connected to one of the posts and pivotally connected to a central pole, wherein each upper pole and corresponding central pole are movable between an extended state and a folded state; and (d) at least three support pole assemblies, each support pole assembly being connected at one end to slide with at least one second outer end and connected at another end to one of the central poles so that when each connector expands to the extended state each upper pole and corresponding central pole also expands to an extended state and each support pole assembly supports one central pole to maintain the central pole and the corresponding upper pole in the extended state.

In accordance with a second embodiment of the invention, the first embodiment is modified so that each support pole assembly comprises a supplementary support pole pivotally connected at one end to a first support pole, wherein the first support pole is connected at one end to slide with at least one outer end and is pivotally connected at the other end to the upper pole, and the supplementary support pole is pivotally connected at the other end to the central pole.

In accordance with a third embodiment of the invention, the first embodiment is modified so that each upper pole and each central pole is bowable and the at least three support pole assemblies bows each upper pole and each central pole when the at least three support pole assemblies are in the extended state so as to configure the roof into a dome.

In accordance with a fourth embodiment of the invention, the second embodiment is further modified so that each upper pole and each central pole is bowable and each support pole assembly bows one of the upper poles and one of the central poles when in the extended state so as to configure the roof into a convex dome.

In accordance with a fifth embodiment of the invention, the first embodiment is modified so the roof further comprises a central joint assembly, wherein each central pole is connected to the central joint assembly.

In accordance with a sixth embodiment of the invention, the fifth embodiment is further modified so that the central joint assembly comprises a first center joint and a second center joint assembly, wherein the second center joint assembly includes a second center joint connected to a plurality of center support poles, wherein each center support pole is pivotally connected to one of the central poles or is pivotally connected to a supplementary center pole.

In accordance with a seventh embodiment of the invention, the sixth embodiment is further modified so that each supplementary center pole is connected at one end to the first center joint and the other end extends freely away from the first center joint when the roof is in the extended state.

In accordance with an eighth embodiment of the invention, the first embodiment is modified so that each expandable connector is an X-shaped scissor assembly comprising a first member pivotally connected at a center portion to a center portion of a second member.

In accordance with a ninth embodiment of the invention, the first embodiment is modified so that a fixed joint is disposed on the upper end of each leg post, each fixed joint includes a pole connecting member extending from a top surface, wherein each pole connecting member is pivotally connected to one of the upper poles.

In accordance with a tenth embodiment of the invention, the first embodiment is modified so that a movable joint is disposed so as to slidably move on each leg post, wherein each movable joint is pivotally connected to one of the support pole assemblies and to at least one of the second outer ends.

In accordance with an eleventh embodiment of the invention, the first embodiment is modified so that a tubular pole joint is disposed on each central pole so that each central pole is inserted through one tubular pole joint, and each tubular pole joint has a protruding hinge, and each protruding hinge is pivotally connected to one end of one of the upper poles.

In accordance with a twelfth embodiment of the invention, the second embodiment is further modified so that a first tubular pole joint is disposed on each first support pole so that each first support pole is inserted through one first tubular pole joint, and each first tubular pole joint has a first protruding hinge, and each first protruding hinge is pivotally connected to one of the supplementary support poles.

In accordance with a thirteenth embodiment of the invention, the twelfth embodiment is further modified so that a second tubular pole joint is disposed on each upper pole so that each upper pole is inserted through one second tubular pole joint, and each second tubular pole joint has a second protruding hinge, and each second protruding hinge is pivotally connected to one of the first support poles.

In accordance with a fourteenth embodiment of the invention, the thirteenth embodiment is further modified so that a third tubular pole joint is disposed on each central pole so that each central pole is inserted through one third tubular pole joint, and each third tubular pole joint has a third protruding hinge, and each third protruding hinge is pivotally connected to one of the supplementary support poles.

In accordance with a fifteenth embodiment of the invention, the fourteenth embodiment is further modified so that a fourth tubular pole joint is disposed on each central pole so that each central pole is inserted through one fourth tubular pole joint, and each fourth tubular pole joint has a fourth protruding hinge, and each fourth protruding hinge is pivotally connected to one of the upper poles.

In accordance with a sixteenth embodiment of the invention, the eleventh embodiment is further modified so that each protruding hinge has a cut out portion forming an operation space contiguous with a hole penetrating through the operation space, and a spherical pivotal member is disposed on the one end of each upper pole, wherein each spherical pivotal member is inserted into one operation space so as to couple the spherical pivotal member to the protruding hinge.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS

The apparatus of the present invention is a portable, foldable tent structure having a roof assembly supported by a roof support assembly that applies force to the bowable poles of the roof assembly so as to configure the roof assembly into a dome shape when the foldable tent structure is deployed in the extended state.

Figure 1:
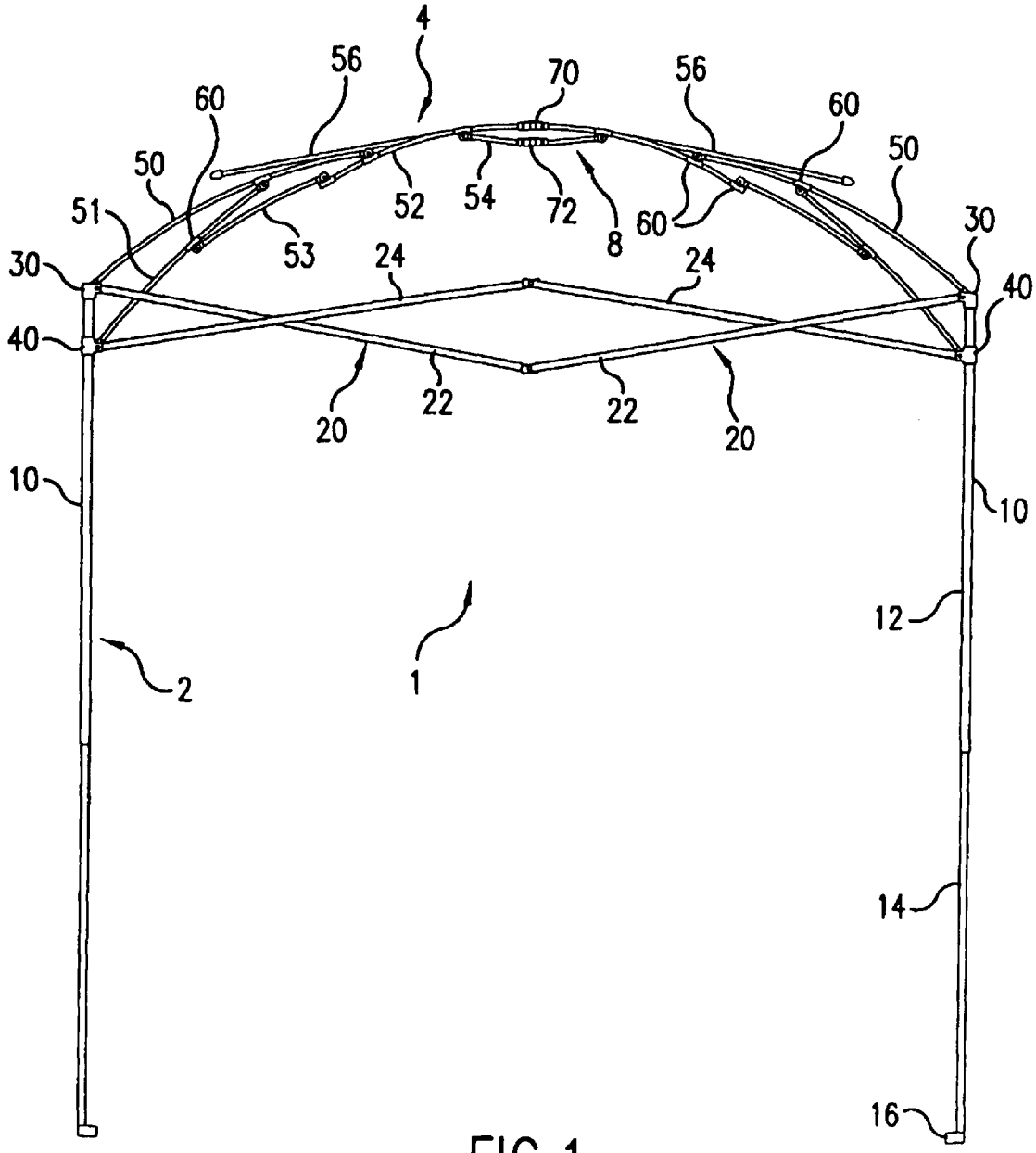
FIG. 1 is a schematic front view of a tent frame in an unfolded state, according to the embodiment of the present invention.
Figure 2:
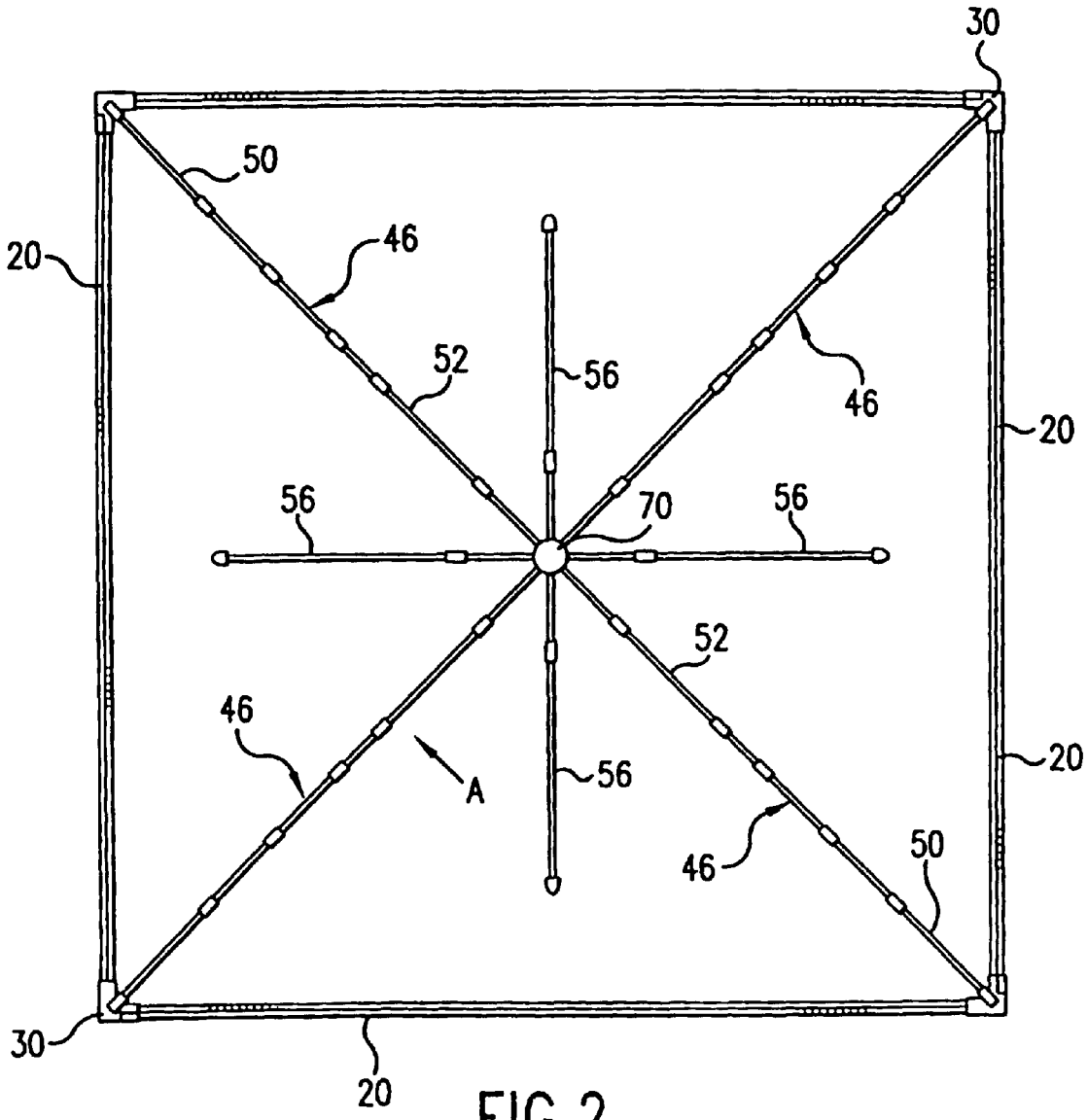
FIG. 2 is a plan view of FIG. 1.
Figure 12:
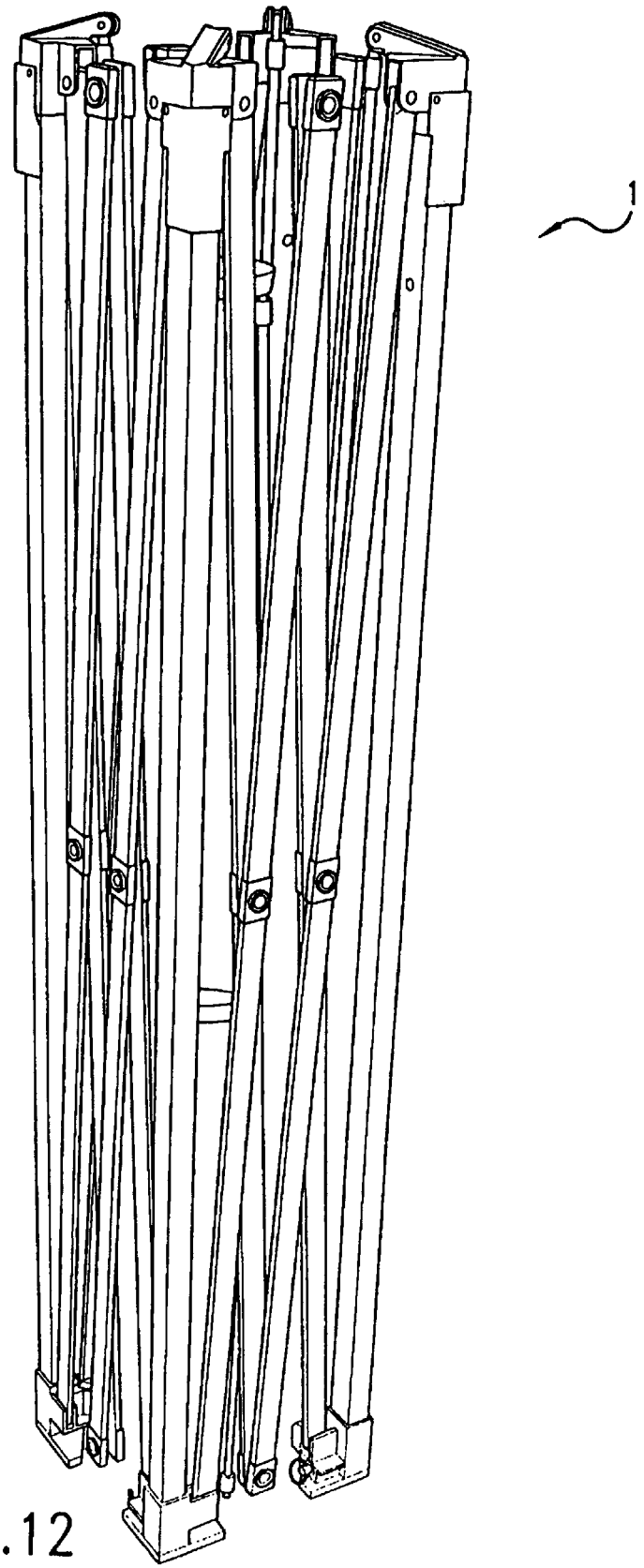
FIG. 12 is a perspective view of the same tent frame shown in FIG. 1, but in the folded state.

FIG. 1 and FIG. 2 schematically depict frontal and plan views, respectively, of the tent frame structure 1 in accordance with the present invention showing the overall configuration of the structure in an unfolded state. The unfolded state may also be referred to as the "expanded state" or the "deployed" state. FIG. 12 schematically depicts the tent frame structure 1 in the folded state. The folded state may also be referred to as the "collapsed state" or the "non-deployed state." The foldable tent frame structure 1 is generally rectangular shape, although the frame could be constructed to have a triangular shape, a pentagonal shape or other generally polygonal shape without departing from the scope of spirit of the present invention.

Tent frame structure 1 includes leg posts 10 provided at all corners, a fixed joint 30 disposed on a top portion of each leg post 10, and a movable joint 40 disposed on a center portion of each leg post 10. Each leg post 10 is a tubular structure including an upper tubular leg member 12 and a lower tubular leg member 14 that are dimensioned so that the lower tubular leg member fits inside of the upper tubular leg member 12. In this manner, lower tubular leg member 14 can slide into and out of upper tubular leg member 12 as evident from FIG. 1 and FIG. 12. Each lower tubular leg member 14 is provided with a foot portion 16 that is used to contact the ground, or other support surface, to improve stability of the tent frame structure 1 when it is in the deployed state.

A pair of expandable connectors 20 are connected between adjacent leg posts 10 so that each connector is connected to both a fixed joint 30 and a movable joint 40 disposed on one of the posts 10. Each expandable connector 20 includes a first member 22 and a second member 24 pivotally connected at the center portion of each member to provide an "X" shaped scissor assembly. Each connector 20 has two inner ends that are pivotally connected to the inner ends of the other connector 20 of the connector pair. Each connector 20 also has a first outer end provided by first member 22 that is pivotally and fixedly connected to a corresponding fixed joint 30, and each connector 20 has a second outer end provided by second member 24 that is pivotally connected to slidingly move with a corresponding movable joint 40. Thus, each pair of expandable connectors 20 provide a scissors type linkage between adjacent pairs of leg posts 10 that allows the configuration of the tent frame structure 1 to move between the folded and unfolded states shown in FIGS. 12 and 1 respectively. As evident from the drawings, there are as many pairs of connectors 20 as there are leg posts 10. For instance, when there are four leg posts 10, then there are four pairs of connectors 20 arranged to connect all of the leg posts together. Furthermore, when there are four leg posts 10 the tent frame structure 1 has a square geometry so fixed joints 30 and movable joints 40 connect adjacent connector pairs at a 90 degree angle from one another as shown in FIG. 2.

For convenience sake, the four leg posts 10 and the four pairs of connectors 20 arranged to connect all of the leg posts together can be referred to as the base assembly 2. Before describing the roof assembly 4, movement of the base assembly 2 is summarized as follows. To deploy the base assembly 2 from the folded state shown in FIG. 12 to the unfolded state shown in FIG. 1, the space between adjacent posts 10 must be manually expanded so that the scissor assemblies of connectors 20 pivotally move or "scissor" to elongate (i.e., form an expanded "X"). The scissoring movement of connectors 20 occurs because the second outer ends provided by second members 24 are connected to move with the movable joint 40. Thus, as movable joint 40 slides or rises on post 10 towards fixed joint 30 each connector 20 scissors and horizontally elongates. Once in the expanded state, a locking mechanism (not shown) is used to secure each movable joint 40 so that the base assembly 2 will be maintained in the expanded state and not allowed to spontaneously fold. To fold the base assembly 2 back to the state shown in FIG. 12, the process is simply reversed by unlocking each locking mechanism, and manually pulling the leg posts 10 together, which forces the movable joints 40 to slide away from the fixed joints 30 as the connectors 20 scissors in the opposite direction and vertically elongate as they are shortened in the horizontal direction (i.e., form a narrow "X").

The roof assembly 4 in accordance with the present invention is best appreciated with reference to FIGS. 1–4. Roof assembly 4 includes a plurality of pole members 46, each pole member being connected to one of the leg posts 10 and is oriented to point towards the center of the roof assembly where the center joint assembly 8 is located. Each pole member 46 includes an upper pole 50 connected to a central pole 52. The upper poles 50 and the lower poles 52 are made of a bendable or bowable material so that each one of these poles has the capability to bend or bow as will be described below and as is needed to generate the desired dome shape of the roof assembly 4 in accordance with an object of the present invention. One end of the upper pole 50 is pivotally connected to a pole connecting member 35 located on a top surface of fixed joint 30, whereas the other end of upper pole 50 is pivotally connected to tubular pole joint 60 disposed on central pole 52. One end of central pole 52 is pivotally connected to a support pole assembly 6, and the other end of central pole 52 is pivotally connected to an upper center joint 70 of the center joint assembly 8.

A roof support assembly is provided to support and reinforce the roof assembly 4 when the roof assembly is in the expanded state shown in FIG. 1 and FIG. 2. The roof support assembly also provides the necessary bending forces to bend or bow each pole member 46 of the roof assembly 4 so as to configure the roof assembly into a convex dome shape. The roof support assembly is provided by a plurality of support pole assemblies 6 where there is a support pole assembly corresponding to, and connected to, each one of the pole members 46.

Figure 3:
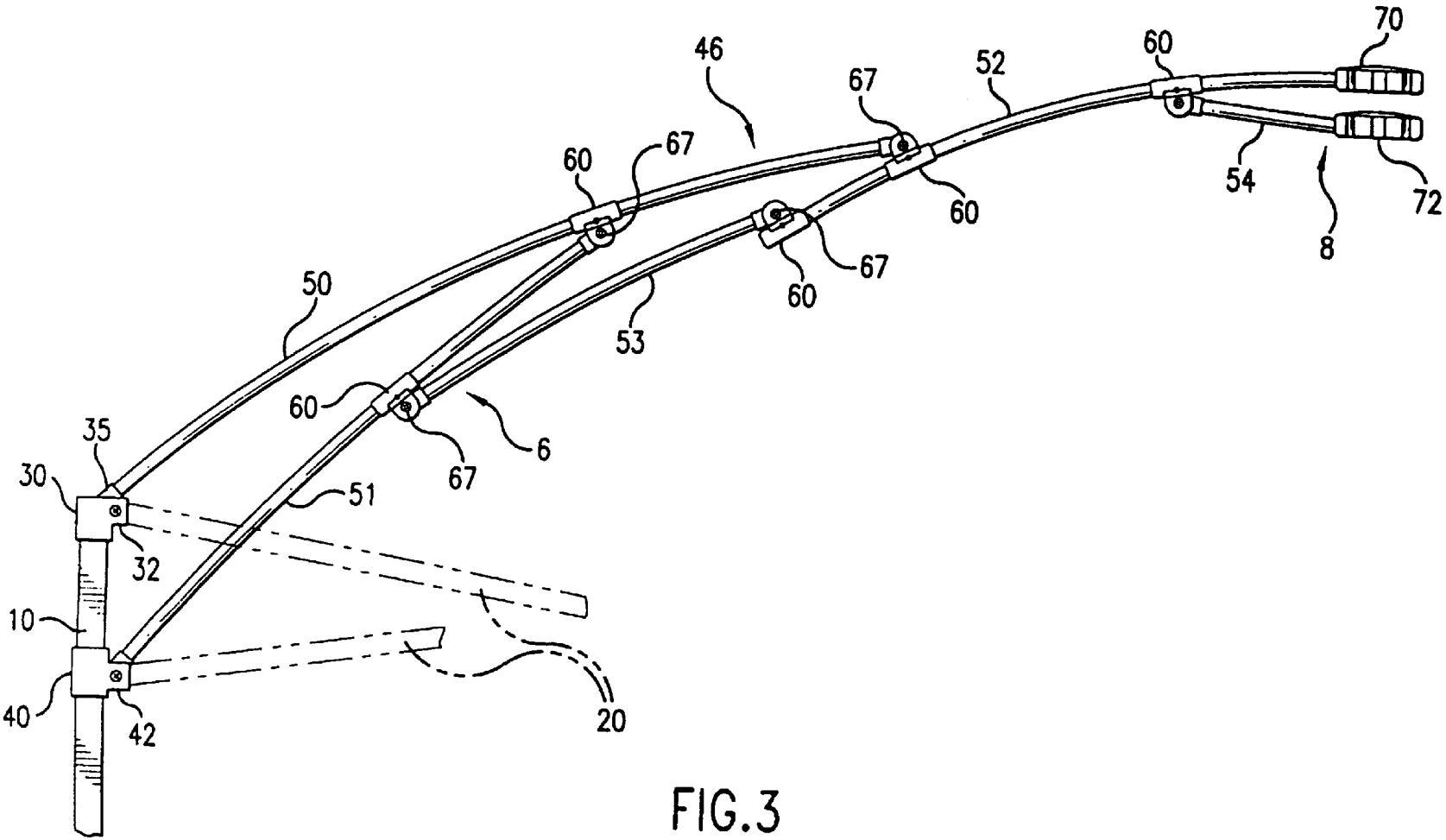
FIG. 3 is a front view of FIG. 2 looking from point "A."
Figure 4:
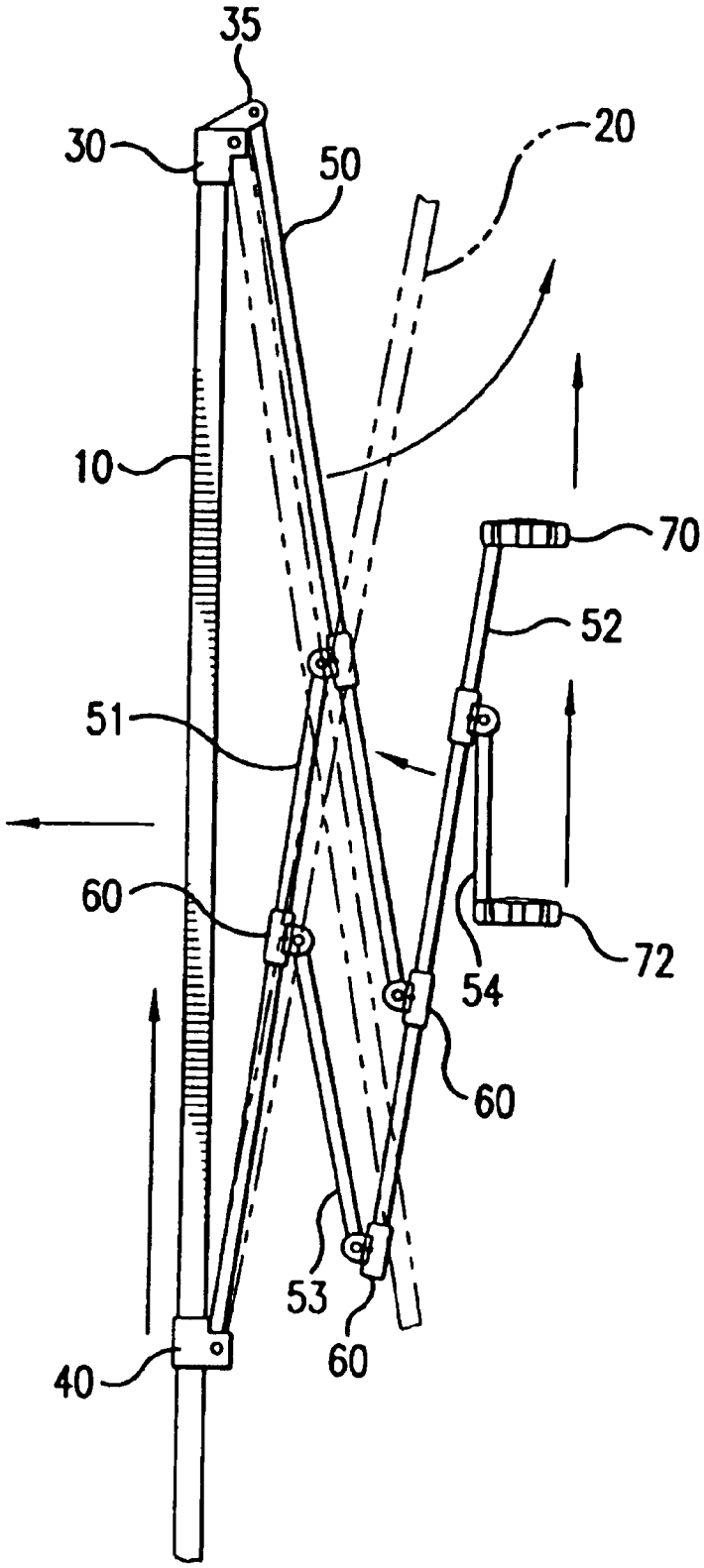
FIG. 4 is a partial frontal view illustrating FIG. 3 in a partially folded state.

Each support pole assembly 6 includes a supplementary support pole 53 pivotally connected to a tubular pole joint 60 disposed on a primary support pole 51 so as to form a "y" shaped structure as shown in FIG. 3. One end of the primary support pole 51 is pivotally connected to slide with movable joint 40, and the other end of the primary support pole 51 is pivotally connected to a tubular pole joint 60 disposed on the upper pole 50 of the corresponding pole member 46. One end of the supplementary support pole 53 is connected to the primary support pole 51, and the other end of the supplementary support pole 53 is pivotally connected to a tubular pole joint 60 disposed at the tip of the central pole 52 of the pole member 46.

Each primary support pole 51 and each supplementary support pole 53 are made of a bendable or bowable material, such as is used to make the upper poles 50 and the central poles 52, so that each one of these poles has the capability to bend or bow. As shown in FIGS. 1, 3, 4 and 12, each support pole assembly 6 has the ability to unfold and fold along with the base assembly 2 and the roof assembly 4. From the partially folded state shown in FIG. 4, it is shown that upper pole 50, central pole 52, primary support pole 51, and supplementary support pole 53 are straight (i.e., unbent or unbowed) when the support pole assembly 6 is folded. However, as shown in FIG. 3, when the support pole assembly 6 is in the deployed state the primary support pole 51 exerts a force on upper pole 50 so as to bend or bow the upper pole, and the supplementary support pole 53 exerts a force on the central pole 52 so as to bend or bow the central pole. Likewise, the upper pole 50 and the central pole 52 exert forces back on primary support pole 51 and supplementary support pole 53 so as to bend these poles to some degree as well. In this manner, the support pole assemblies 6 of the roof support assembly acts on the pole members 46 of the roof assembly 4.

The roof assembly 4 also includes the center joint assembly 8, which is connected to each one of the pole members 46. The center joint assembly 8 includes upper center joint 70 and a lower center joint assembly, wherein the lower center joint assembly comprises lower center joint 72 and a plurality of supplementary center support poles 54 pivotally connected to the lower center joint 72. The purpose of the center joint assembly is to prevent substantial sagging of the roof assembly 4 when a tent cloth or canopy (not shown) is laid over the tent frame structure 1. Substantial sagging of the tent cloth or canopy is typically seen with prior art tent frame structures that do not have a center joint assembly as provided in the present invention. To achieve a fuller dome shape for the roof assembly 4, the center joint assembly of the present invention is also provided with a plurality of long supplementary central poles 56. There are as many long supplementary central poles 56 as there are pole members 46 because there is one supplementary central pole 56 disposed between each pair of adjacent pole members 46 as shown in FIG. 2. Each supplementary central pole 56 is pivotally connected at one end to the upper center joint 70 and is also pivotally connected to a supplementary center support pole 54 as described below. The other end of each supplementary central pole 56 extends freely away from the upper center joint 70 and has a smooth member disposed on the tip so as to prevent damage to the tent cloth or canopy. The configuration of the supplementary central poles 56 is well depicted in FIG. 1 and FIG. 2, and though the angle or orientation between supplementary central poles 56 and the ground is not the same as that of the central poles 52 as seen in the drawings in the absence of a tent cloth, one skilled in the art would appreciate that once tent frame structure 1 is overlaid with tent cloth, the supplementary central poles 56 will bend or bow until their angle or orientation is about the same as that of the central poles 52 due to the elastic tension provided by the tent cloth.

The center joint assembly has one supplementary center support pole 54 for each one of the pole members 46 and the supplementary central poles 56 so that each supplementary center support pole 54 is pivotally connected at one end to the lower center joint 62 and pivotally connected at the other end to a tubular pole joint 60 disposed on the central pole 52 of the corresponding pole member 46 or to a tubular pole joint 60 disposed on one of the supplementary central poles 56. Thus, when the center joint assembly is in the expanded state shown in FIG. 1 and FIG. 2, the supplementary central poles 56 are deployed between the pole members 46 to prevent a tent cloth or canopy from sagging in these regions.

Several other salient features in accordance with the present invention will now be described with reference to FIGS. 5–11.

Figure 5:
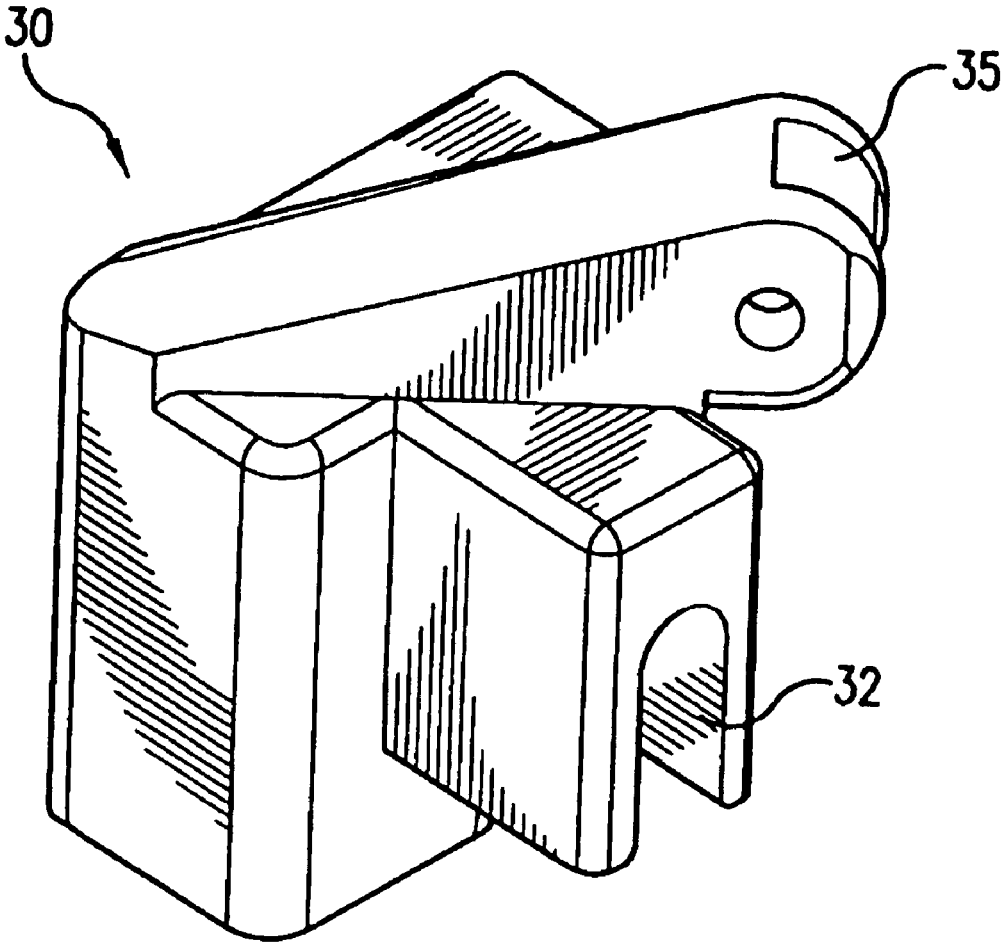
FIG. 5 is a side view illustrating the fixed joint of the present invention.
Figure 6:
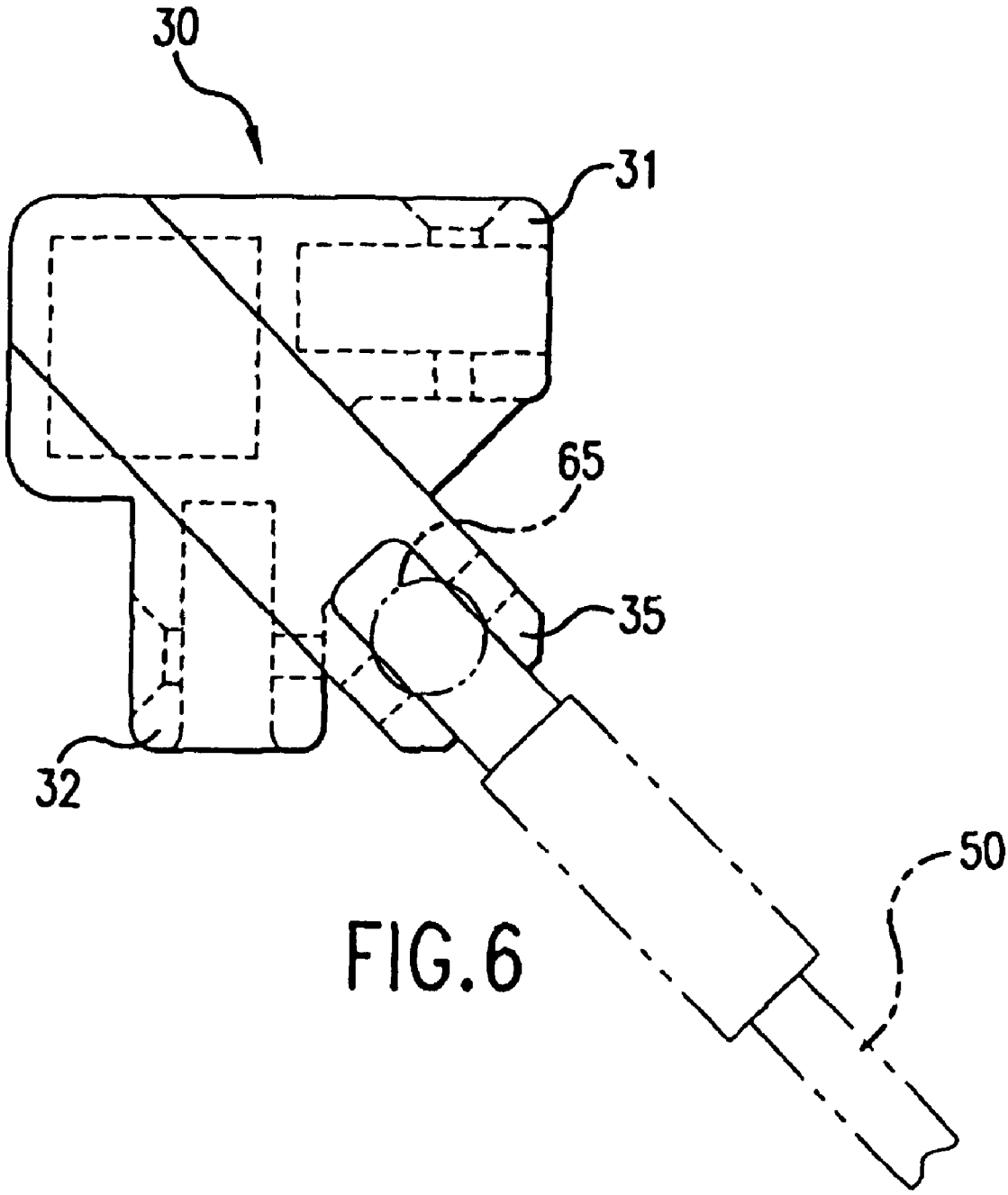
FIG. 6 is a plan view of FIG. 5.

FIGS. 5 and 6 show the structure of each fixed joint 30, which has a cavity for receiving a leg post 10, supporting member portions 31 and 32 for receiving and pivotally connecting to first members 22, and a pole connecting member 35 disposed on a top surface of the fixed joint 30 and configured to pivotally connect to a pole member 46. A spherical movable member 65 is disposed on the end of upper pole 50 of pole member 46 to pivotally connect to the pole connecting member 35.

Figure 7:
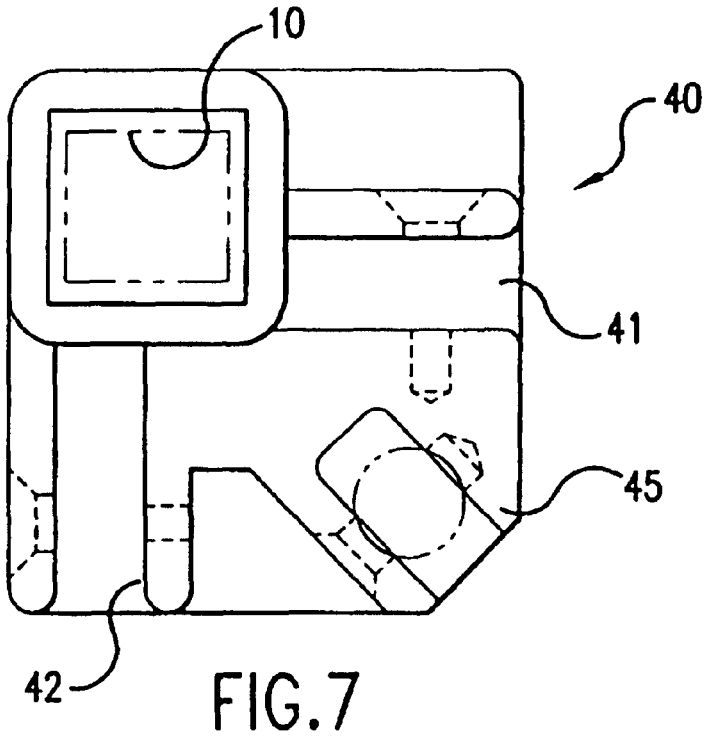
FIG. 7 is a plan view illustrating the movable joint of the present invention.

FIG. 7 shows the structure of each movable joint 40, which has a cavity through which leg post 10 passes, supporting member portions 41 and 42 for receiving and pivotally connecting to second members 24, and a pole connecting member 45 configured to pivotally connect to the primary support pole 51 of a support pole assembly 6. A spherical movable member 65 would be disposed on the end of primary support pole 51 to pivotally connect it to the pole connecting member 45.

Figure 8:
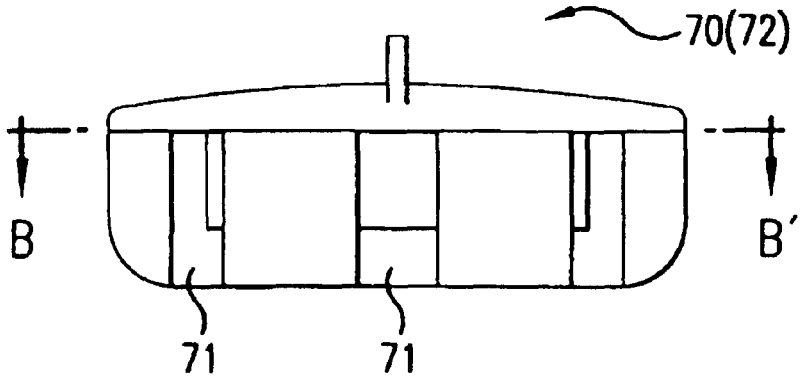
FIG. 8 is a front view illustrating the center joint of the present invention.
Figure 9:
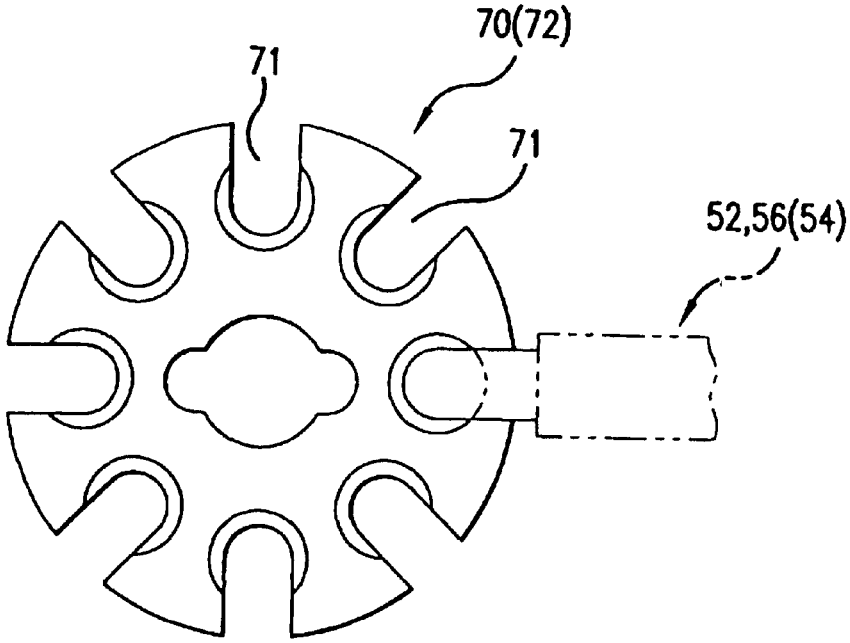
FIG. 9 is a sectional view of line B—B of FIG. 8.

FIGS. 8 and 9 show the structure of upper center joint 70 and lower center joint 72, each of which has a plurality of connection member portions 71 for receiving and pivotally connecting to various pole structures such as central poles 52 of pole members 46, supplementary central poles 56, or supplementary center support poles 54 depending upon which center joint is described. For example, when the tent frame structure 1 has a square base assembly 2, upper center joint 70 has eight connection member portions 71, four of which are connected to the four pole members 46, and four of which are connected to the four supplementary central poles 56. When upper center joint 70 has eight connection member portions 71, then lower center joint 72 also has eight connection member portions 71. However, all eight of the connection member portions of lower center joint 72 are connected to supplementary central support poles 54.

Figure 10:
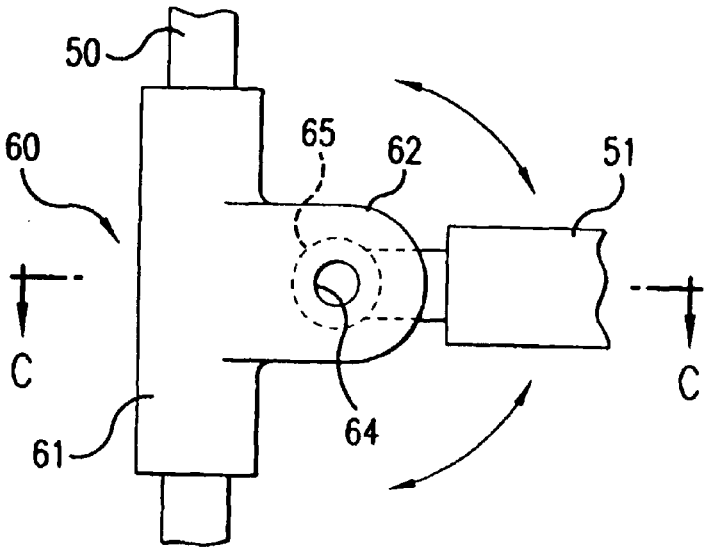
FIG. 10 is a frontal view illustrating the pole joint of the present invention.
Figure 11:
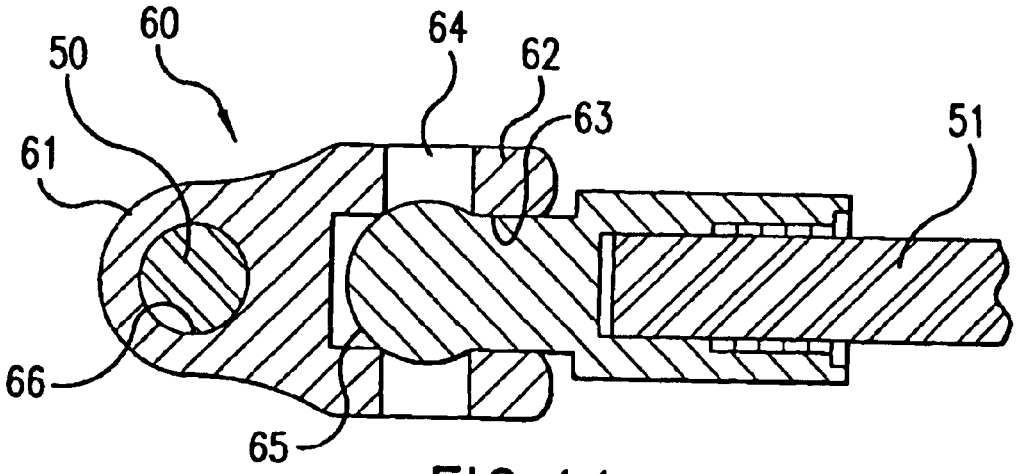
FIG. 11 is a cross-sectional view of line C—C of FIG. 10.

FIGS. 10 and 11 show the structural details of a tubular pole joint 60 and its relationship disposed on a first pole such as any one of the tubular pole joints 60 shown in FIG. 3 on upper pole 50, or central pole 52, or primary support pole 51. Tubular pole joint 60 is formed to have a tubular body 61 and a hinge 62 elongated from the center of the body 61 so that a first pole inserted through tubular hole 66 is secured to the tubular body 61. The end of another interconnecting pole, such as upper pole 50, or primary support pole 51, or supplementary support pole 53 is pivotally coupled with the hinge 62.

Specifically, hinge 62 effects a movable connection to the end of the interconnecting pole because hinge 62 has a specially configured hole 64 formed by configuring a cut-out operation space 63 so as to form hole 64 to penetrate the center of space 63 from the side. Each interconnecting pole has a spherical movable member 65 disposed at the end as shown in FIG. 11. Thus, the spherical movable member 65 of each interconnecting pole is inserted into the operation space 63 by force, thereby providing a movable hinged connection (see double arrows in FIG. 10) between spherical movable member 65 and the hinge 62 as shown in FIGS. 10 and 11 that never becomes disengaged while moving because of its alignment with the axis of the spherical movable member. After the spherical movable member 65 has been coupled to the hinge 62, a coupling pin or a bolt 67 is used to penetrate the spherical movable member 65 through the hole 64 to achieve a more secure movable coupling.

The functional operation of the tent frame structure 1 of the present invention can be summed up as follows.

As described above, the basic unfolding of the connectors 20 of the base assembly 2 of the foldable tent frame structure 1 according to the present invention was already described above with reference to FIGS. 12 and 1. In the tent frame structure 1, the roof assembly 4 and the roof support assembly both expand with the base assembly 2 and fold with the base assembly 2. Therefore, the description below will focus on the deployment of the roof assembly 4 as the base assembly 2 is deployed.

First, when the leg posts 10 are radially spread apart to unfold the tent frame structure as shown between FIGS. 1 and 12, the movable joints 40 all rise along the leg posts 10 by the operation (i.e., scissoring) of the connectors 20. As the primary support poles 51 connected to the movable joints 40 rise, the upper poles 50 are pushed upward and the angle formed between each primary support pole 51 and its connected upper pole 50 becomes narrower, accordingly.

As the upper poles 50 are pushed upward, the central poles 52 connected to the ends of the upper poles will also be lifted. As leg posts 10 move further apart, the upper poles 50 and the central poles 52 are lifted up, thereby causing each supplementary support pole 53 connected to its support pole 51 to pull the lower end of the corresponding central pole 52. Consequently, the central poles 52 will be erected by bending or bowing in a horizontal direction.

In the course of such a deployment operation, the upper poles 50 and central poles 52 form a full convex dome-shaped roof with a gentle curve that has not been previously achieved by other prior art tent structures. Since this structure is tensioned by its deployment it resists any lowering of its profile of flexing to provide a fairly rigid profile.

In the course of forming the roof of a foldable tent as illustrated above, the present invention forms a full convex circular dome-shaped roof by appropriately connecting a plurality of resilient poles. In comparison with the conventional configuration, the present invention offers a tent frame with a simpler structure and a lighter weight, minimizes the installation space with less impact from the wind, and best of all offers a new style of roof, improving on the ubiquitous triangular or pyramidal shape (i.e., "A" shape) of conventional tents.

While the present invention has been described with reference to certain preferred embodiments, one of ordinary skill in the art will recognize that additions, deletions, substitutions, modifications and improvements can be made while remaining within the scope of the spirit of the present invention as defined by the appended claims.

What is claimed is:

1. A foldable tent frame comprising:

at least three leg posts, each post being located at a corner of the tent frame;

a plurality of expandable connectors connected in pairs, wherein each pair of expandable connectors connects between two adjacent posts, wherein each connector has a first outer end and a second outer end, wherein each connector is fixedly connected at the first outer end to the upper end of one of the posts and is slidably connected at the second outer end to a lower portion of the same one of the posts, wherein each connector is movable between an extended state and a folded state;

a roof comprising at least three upper poles, each upper pole being pivotally connected to one of the posts and pivotally connected to a central pole, wherein each upper pole and corresponding central pole are movable between an extended state and a folded state; and at least three support pole assemblies, each support pole assembly being connected at one end to slide with at least one second outer end and connected at another end to one of the central poles so that when each connector expands to the extended state each upper pole and corresponding central pole also expands to an extended state and each support pole assembly supports one central pole to maintain the central pole and the corresponding upper pole in the extended state.

2. A tent frame according to claim 1, wherein each support pole assembly comprises a supplementary support pole pivotally connected at one end to a first support pole, wherein the first support pole is connected at one end to slide with at least one outer end and is pivotally connected at the other end to the upper pole, and the supplementary support pole is pivotally connected at the other end to the central pole.

3. A tent frame according to claim 1, wherein each upper pole and each central pole is bowable and the at least three support pole assemblies bows each upper pole and each central pole when the at least three support pole assemblies are in the extended state so as to configure the roof into a dome.

4. A tent frame according to claim 2, wherein each upper pole and each central pole is bowable and each support pole assembly bows one of the upper poles and one of the central poles when in the extended state so as to configure the roof into a convex dome.

5. A tent frame according to claim 1, wherein the roof further comprises a central joint assembly, wherein each central pole is connected to the central joint assembly.

6. A tent frame according to claim 5, wherein the central joint assembly comprises a first center joint and a second center joint assembly, wherein the second center joint assembly includes a second center joint connected to a plurality of center support poles, wherein each center support pole is pivotally connected to one of the central poles or is pivotally connected to a supplementary center pole.

7. A tent frame according to claim 6, wherein each supplementary center pole is connected at one end to the first center joint and the other end extends freely away from the first center joint when the roof is in the extended state.

8. A tent frame according to claim 1, wherein each expandable connector is an X-shaped scissor assembly comprising a first member pivotally connected at a center portion to a center portion of a second member.

9. A tent frame according to claim 1, wherein a fixed joint is disposed on the upper end of each leg post, each fixed joint includes a pole connecting member extending from a top surface, wherein each pole connecting member is pivotally connected to one of the upper poles.

10. A tent frame according to claim 1, wherein a movable joint is disposed so as to slidably move on each leg post, wherein each movable joint is pivotally connected to one of the support pole assemblies and to at least one of the second outer ends.

11. A tent frame according to claim 1, wherein a tubular pole joint is disposed on each central pole so that each central pole is inserted through one tubular pole joint, and each tubular pole joint has a protruding hinge, and each protruding hinge is pivotally connected to one end of one of the upper poles.

12. A tent frame according to claim 2, wherein a first tubular pole joint is disposed on each first support pole so that each first support pole is inserted through one first tubular pole joint, and each first tubular pole joint has a first protruding hinge, and each first protruding hinge is pivotally connected to one of the supplementary support poles.

13. A tent frame according to claim 12, wherein a second tubular pole joint is disposed on each upper pole so that each upper pole is inserted through one second tubular pole joint, and each second tubular pole joint has a second protruding hinge, and each second protruding hinge is pivotally connected to one of the first support poles.

14. A tent frame according to claim 13, wherein a third tubular pole joint is disposed on each central pole so that each central pole is inserted through one third tubular pole joint, and each third tubular pole joint has a third protruding hinge, and each third protruding hinge is pivotally connected to one of the supplementary support poles.

15. A tent frame according to claim 14, wherein a fourth tubular pole joint is disposed on each central pole so that each central pole is inserted through one fourth tubular pole joint, and each fourth tubular pole joint has a fourth protruding hinge, and each fourth protruding hinge is pivotally connected to one of the upper poles.

16. A tent frame according to claim 11, wherein each protruding hinge has a cut out portion forming an operation space contiguous with a hole penetrating through the operation space, and a spherical pivotal member is disposed on the one end of each upper pole, wherein each spherical pivotal member is inserted into one operation space so as to couple the spherical pivotal member to the protruding hinge.

17. A foldable tent frame comprising:

at least four leg posts, each post being located at a corner of the tent frame;

a plurality of expandable connectors connected in pairs, wherein each pair of expandable connectors connects between two adjacent posts, wherein each connector has a first outer end and a second outer end, wherein each connector is fixedly connected at the first outer end to the upper end of one of the posts and is slidably connected at the second outer end to a lower portion of the same one of the posts, wherein each connector is movable between an extended state and a folded state;

a roof comprising at least four upper poles, each upper pole being pivotally connected to one of the posts and pivotally connected to a central pole, wherein each upper pole and corresponding central pole are movable between an extended state and a folded state; and at least four support pole assemblies, each support pole assembly being connected at one end to slide with at least one second outer end and connected at another end to one of the central poles so that when each connector expands to the extended state each upper pole and corresponding central pole also expands to an extended state and each support pole assembly supports one central pole to maintain the central pole and the corresponding upper pole in the extended state.

18. A foldable tent frame comprising:

four leg posts, each post being located at a corner of the tent frame;

a plurality of expandable connectors connected in pairs, wherein each pair of expandable connectors connects between two adjacent posts, wherein each connector has a first outer end and a second outer end, wherein each connector is fixedly connected at the first outer end to the upper end of one of the posts and is slidably connected at the second outer end to a lower portion of the same one of the posts, wherein each connector is movable between an extended state and a folded state;

a roof comprising four upper poles, each upper pole being pivotally connected to one of the posts and pivotally connected to a central pole, wherein each upper pole and corresponding central pole are movable between an extended state and a folded state; and four support pole assemblies, each support pole assembly being connected at one end to slide with at least one second outer end and connected at another end to one of the central poles so that when each connector expands to the extended state each upper pole and corresponding central pole also expands to an extended state and each support pole assembly supports one central pole to maintain the central pole and the corresponding upper pole in the extended state.

* * * * *